(12) United States Patent
Philipp

(10) Patent No.: US 12,063,408 B2
(45) Date of Patent: Aug. 13, 2024

(54) METHOD AND A SYSTEM FOR RECORDING MULTIMEDIA FILE PRESENTATION SESSION

(71) Applicant: Intel Corporation, Santa Clara, CA (US)

(72) Inventor: Sagiv Philipp, Ra'anana (IL)

(73) Assignee: Intel Corporation, Santa Clara, CA (US)

( * ) Notice: Subject to any disclaimer, the term of this patent is extended or adjusted under 35 U.S.C. 154(b) by 103 days.

(21) Appl. No.: 17/126,578

(22) Filed: Dec. 18, 2020

(65) Prior Publication Data

US 2021/0195278 A1 Jun. 24, 2021

Related U.S. Application Data

(60) Provisional application No. 62/950,429, filed on Dec. 19, 2019.

(51) Int. Cl.
| | | |
|---|---|---|
| *H04N 21/43* | (2011.01) | |
| *H04L 67/02* | (2022.01) | |
| *H04L 67/06* | (2022.01) | |
| *H04L 67/104* | (2022.01) | |
| *H04N 21/8547* | (2011.01) | |

(52) U.S. Cl.
CPC ......... *H04N 21/4307* (2013.01); *H04L 67/02* (2013.01); *H04L 67/06* (2013.01); *H04L 67/104* (2013.01); *H04N 21/8547* (2013.01)

(58) Field of Classification Search
CPC .................. H04N 21/4307; H04N 21/8541
See application file for complete search history.

(56) References Cited

U.S. PATENT DOCUMENTS

| | | | |
|---|---|---|---|
| 2015/0264272 A1* | 9/2015 | Burns | G11B 27/10 386/201 |
| 2017/0133058 A1* | 5/2017 | Panchapakesan | G11B 20/10527 |
| 2020/0404048 A1* | 12/2020 | Glazer | H04L 67/52 |

* cited by examiner

*Primary Examiner* — Suraj M Joshi
(74) *Attorney, Agent, or Firm* — Alliance IP, LLC

(57) ABSTRACT

The present invention provides a method for recording session of a multimedia file presentation displayed on external screen device and controlled by one more control device, implemented by one or more processors operatively coupled to a non-transitory computer readable storage device, on which are stored modules of instruction code that when executed cause the one or more processors to perform
  disapplying said multimedia file on the external screen using a designated application;
  capturing user interaction of uploaded UI on each mobile device;
  sending captured interaction command by at least one of the mobile devices to the external screen device;
  Receiving captured control commands at the external display device over cloud or P2P connection associated with file ID from each mobile device which established P2P connection with external device;
  executing said instructions based on pre-defined interaction commands definitions;
  Recording captured control commands: slides presentation and hovering/pointing action
  Receiving voice stream session from each Mobile device and recording audio verbal comments in synchronization with presentation display session associated with user mobile ID and time stamp.

17 Claims, 7 Drawing Sheets presentation sessions Recoding module 200:

Following the establishment of P2P connection between the mobile device and external display device Sharing multimedia file through the P2P connection with ID saving at file at local volatile memory of external display device or sharing file saved at a server 212

Displaying multimedia file from local volatile memory or from cloud 213 optionally translating/converting of file to unified/ standard / vectorized file format , such as PDF , which can activate by graphical software 214

User triggering recording start of session using designated interface button

Receiving captured control commands at the external display through defined session device) over cloud or P2P connection associated with file ID from each mobile device which established P2P connection 216

Maintaining timing log of each presentation page viewing time

Recording captured control commands: slides presentation and hovering/pointing action , maintain timing of each action user ID for each action and creating log of action Receiving voice stream session from each Mobile device and recording audio verbal comments in synchronization with presentation display associate ID of user device 220

User triggering recording end of session using designated interface button

Figure 3 interface device module 300:

Following the establishment of P2P connection between the mobile device and external display device Sending multimedia file with ID to the external device 312

Selecting uploading relevant UI related to the multimedia file 314

Monitoring user interaction with UI 316

Capturing interaction data with UI functionalities ( mouse like motion on touch screen , touch operational buttons ( zoom, select, typing on virtual keyboard , drawing commands 318

Transmitting capture interaction to external display device 320

Streaming in real time voice and/or video session of each mobile device 322

Figure 4

Designated player 700:

Receiving request for customized recordation of presentation session with customization parameters: type of action, user ID , slides ID/content 712

Search presentation session recordation of activity log for requested customization parameters identifying time log for each required recordation/presentation time period and or identified action identifying presented page 714

Optionally Generating presentation (optionally in real time ) video based on timing log of each presentation page viewing time and timing of each user captured interaction by simulating execution of captured interaction command based on pre-defined interaction commands definition 718 A Generating customized presentation (optionally in real time ) video based on timing log of each requested presentation page viewing time and timing of each user requested captured interaction by simulating execution of captured interaction command based on pre-defined interaction commands definition 718 B integrating generated presentation into a single video and synchronizing with respective audio parts of the same identified time log from one mobile device or multiple mobiles devices 720

Streaming generated presentation synchronized with respective audio parts of the same identified time log 722

Figure 7

METHOD AND A SYSTEM FOR RECORDING MULTIMEDIA FILE PRESENTATION SESSION

FIELD OF THE INVENTION

The present invention relates to the field of recording multimedia file presentation sessions. More specifically, the present invention relates to the field of recording a multimedia file presentation session on an external screen using multiple mobile devices which participate in the presentation sessions.

SUMMARY OF THE INVENTION

The present invention provides a method for recording session of a multimedia file presentation displayed on external screen device and controlled by one more control device, implemented by one or more processors operatively coupled to a non-transitory computer readable storage device, on which are stored modules of instruction code that when executed cause the one or more processors to perform
  disapplying said multimedia file on the external screen using a designated application;
  capturing user interaction of uploaded CT on each mobile device;
  sending captured interaction command by at least one of the mobile devices to the external screen device;
  Receiving captured control commands at the external display device over cloud or P2P connection associated with file ID from each mobile device which established P2P connection with external device
  executing said instructions based on pre-defined interaction commands definitions;
  Recording captured control commands: slides presentation and hovering/pointing action
  Receiving voice stream session from each Mobile device and recording audio verbal comments in synchronization with presentation display session associated with user mobile ID and time stamp.

The present invention provides a method for recording session of a multimedia file presentation displayed on external screen device and controlled by one more control device, implemented by one or more processors operatively coupled to a non-transitory computer readable storage device, on which are stored modules of instruction code that when executed cause the one or more processors to perform
  disapplying said multimedia file on the external screen using a designated application;
  capturing at least one user interaction commands with the presentation of an uploaded UI on each mobile device; wherein the user interaction include control commands and action applied on the presentation.
  sending captured at least one user interaction command by at least one of the mobile devices to the external screen device; Receiving captured control commands at the external display device over cloud or P2P connection associated with file II) from each mobile device which established P2P connection with external device;
  executing said at least one user instructions commands based on pre-defined interaction commands definitions;
  Recording captured interaction commands of at least one user though a time line;
  recording audio verbal comments in synchronization with presentation display session time log associated with user mobile ID and time stamp.

According to some embodiments of the present invention the method further comprising the step generating presentation video based on timing log of each presentation page viewing time and timing and of each user captured interaction by simulating execution of captured interaction command based on pre-defined interaction commands definition.

According to some embodiments of the present invention the method further comprising the step integrating generated presentation into a single video and synchronizing with respective audio parts of the same identified time log.

According to some embodiments of the present invention, each recorded user interaction command is tagged in a time line based on characteristics of each interaction command including at least one of: user ID, type of command, ID of slide, context/content of slide.

According to some embodiments of the present invention the method further comprising the step of searching presentation session recordation of activity log for requested customization parameters based on characteristics of each interaction command, identifying time log for each required recordation/presentation time period and or identified action identifying presented page.

According to some embodiments of the present invention the method further comprising the step generating customized presentation video based on timing log of each requested presentation pages viewing time and timing of each user requested captured interaction by applying execution of requested captured interaction command based on pre-defined interaction commands definition and synchronizing with respective audio parts of the same identified time log.

According to some embodiments of the present invention, the uploaded UI is related/associated with said multimedia file based on type of file or content upon establishing communication between the external screen and the mobile device.

According to some embodiments of the present invention, each the audio session is recorded at the mobile device of the each user, wherein the recorded audio is transferred or streamed to the server.

According to some embodiments of the present invention, the multimedia file is Shared through the P2P connection with ID, wherein the multimedia filed is saved at local volatile memory of external display device or the file saved at a server.

The present invention provides a system for recording session of a multimedia file presentation displayed on external screen device and controlled by one more control device, implemented by one or more processors operatively coupled to a non-transitory computer readable storage device, on which are stored modules of instruction code that when executed cause the one or more processors to perform
  Designated presentation application installed on the external screen device configured to display said multimedia file on the external screen device;
  Presentation interface module installed on the one or more control device, configured to:
    a capture at least one user interaction commands with the presentation of an uploaded UI on each mobile device; wherein the user interaction include control commands and action applied on the presentation.
    sending captured at least one user interaction command by at least one of the mobile devices to the external screen device; wherein the Designated presentation application is configured to:
  Receive captured control commands at the external display device over cloud or P2P connection associated with file ID from each mobile device which established P2P connection with external device;

executing said at least on user instructions commands based on pre-defined interaction commands definitions;

Recording at least one captured user interaction commands of slides presentation;

recording audio verbal comments in synchronization with presentation display session associated with user mobile ID and time stamp.

According to some embodiments of the present invention each recorded user interaction command is tagged in a time line based on characteristics of each interaction command including at least one of: user ID, type of command, ID of slide, context/content of slide.

According to some embodiments of the present invention the system further comprising designated display module configured to generate presentation video based on timing log of each presentation page viewing time and timing and of each user captured interaction by simulating execution of captured interaction command based on pre-defined interaction commands definition.

According to some embodiments of the present invention the system further comprising designated display module configured to integrated generated presentation into a single video and synchronizing with respective audio parts of the same identified time log According to some embodiments of the present invention the system further comprising Designated player configured to generate customized/personalized video of presentation by:

searching presentation session recordation of activity log for requested customization parameters based on characteristics of each interaction command, identifying time log for each required recordation/presentation time period and or identified action identifying presented page;

generating customized presentation video based on timing log of each requested presentation pages viewing time and timing of each user requested captured interaction by applying execution of requested captured interaction command based on pre-defined interaction commands definition; and synchronizing with respective audio parts of the same identified time log.

According to some embodiments of the present invention the uploaded UI is associated with said multimedia file based on type of file or content upon establishing communication between the external screen and the mobile device.

According to some embodiments of the present invention each the audio session is recorded at the mobile device of the each user, wherein the recorded audio is transferred or streamed to the server.

According to some embodiments of the present invention the multimedia file is Shared through the P2P connection with ID, wherein the multimedia filed is saved at local volatile memory of external display device or the file saved at a server.

BRIEF DESCRIPTION OF DRAWINGS

FIG. 3 is a flowchart diagram illustrating the processing presentation sessions of a recoding module according to some embodiments of the invention.

FIG. 4 is a flowchart diagram illustrating an interface device module according to some embodiments of the invention.

FIG. 7 is a flowchart diagram illustrating the processing of the designated player module according to some embodiments of the invention.

DETAILED DESCRIPTION OF THE INVENTION

Following is a table of definitions of the terms used throughout this application.

| Term | Definition |
| --- | --- |
| Control/source commuter device | A computerized device that is capable of producing multimedia files and is configured to transmit these multimedia files to an external display device and transmit control commands such as mobile phone, laptop, or tablet. |
| External display device display | A display device having a communication module connected to communication network such Smart TV or computer screen |
| Content/multimedia file | Any type of content file, presentation file, such as word, power point, video animation etc. |

In the following detailed description of various embodiments, reference is made to the accompanying drawings that form a part thereof, and in which are shown by way of illustration of specific embodiments in which the invention may be practiced. It is understood that other embodiments may be utilized and structural changes may be made without departing from the scope of the present invention.

Figure 1:
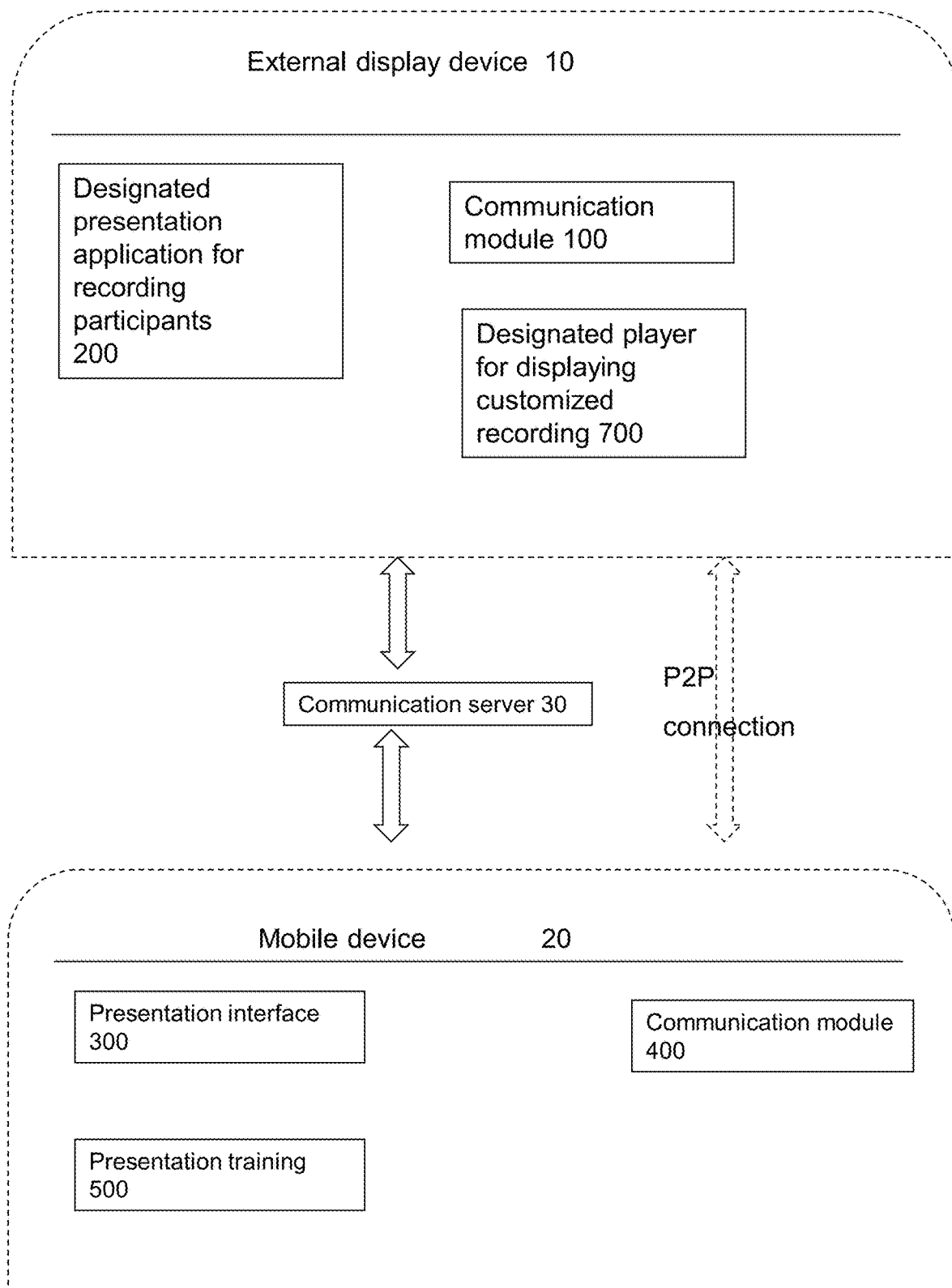
FIG. 1 is a block diagram of an external display device in communication with a source computer device through a communication server according to some embodiments of the invention.

FIG. 1 is a block diagram of an external display device 10 in communication with at least one mobile device (control device) 20 through a communication server 30 according to some embodiments of the invention.

The external display device 10 comprises a communication module 100 and a designated presentation application 200. In accordance with some embodiments of the present invention, communication module 100 enables establishing communication and transferring multimedia files between the at least one mobile device 20 and the external display device 10.

In accordance with some embodiments of the present invention, designated presentation application 200 is used for recording participants. For instance, a Web application may be configured for recording captured control commands such as slides presentation, hovering/pointing actions and the like.

Presentation application 200 is further used for receiving voice stream sessions from each one of the at least one mobile device 20 and for recording audio verbal comments which are synchronized timewise with the sessions of presentation.

The at least one mobile device 20 comprises:
Presentation interface 300, communication module 400, and presentation training module 500. The communication module 400 is configured to enable establishing communication and to transfer multimedia files between the at least one mobile device 20 and the external display device 10. The presentation interface 300 is configured to enable the user to control the presentation and take interaction actions related to the presentation, such as pointing, drawings, and writing messages. The training module is configured to enable the user to practice the presentation, through practice the user can perform any action taken during normal presentation. The training session is recorded as a presentation session, including time log, voice session, and all actions taken throughout the training session.

In accordance with some embodiments of the present invention, presentation interface 300 controls the presentation and content of a multimedia file which is presented at external display device 10 and sends a voice session.

The communication server 30 enables establishing communication between the at least one mobile device 20 and the external display device 10, e.g., enabling the device P2P connection using for example Web RTC protocol.

According to some embodiments of the present invention, the at least one mobile device 20 located nearby the external display device 10 may establish communication with the external display device 10 for controlling the multimedia file.

According to some embodiments of the present invention, the external display device 10 may reverse (reverse mirroring) the multimedia stream to the at least one mobile device 20.

According to some embodiments of the present invention, the user may remotely establish connection between his/her mobile device 20 and the external display device 10 using a pin code or an invitation via an electronic message (email, text message and the like).

According to some embodiments of the present invention, the remote participants that are not located at the presentation room may connect to an audio channel and hear the other participants through the P2P communication.

Figure 2:
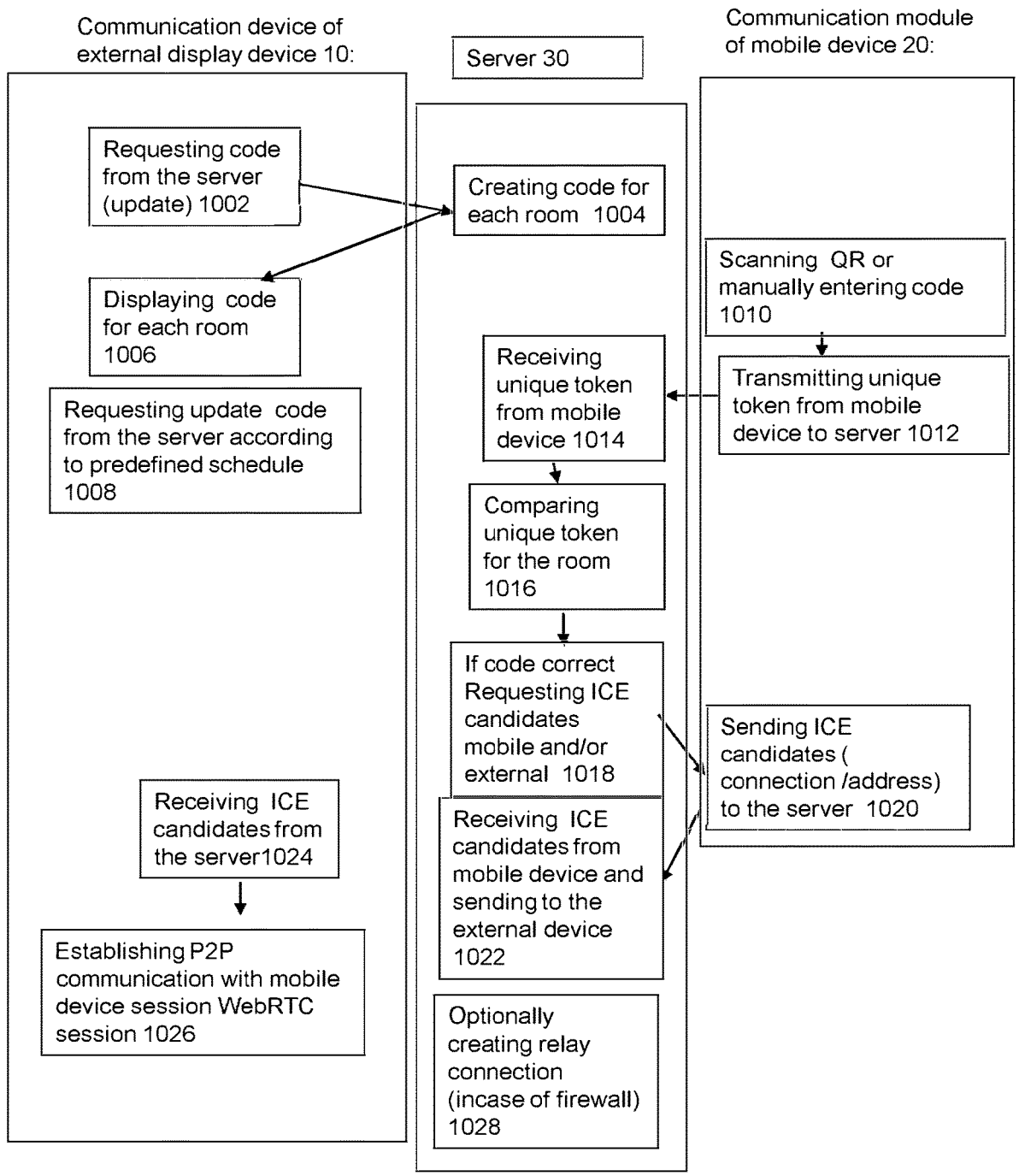
FIG. 2 is a flowchart diagram illustrating the communication procedure according to some embodiments of the invention.

FIG. 2 is a flowchart diagram illustrating the communication procedure according to some embodiments of the invention.

The communication procedure comprises the following steps:
Requesting a code from the server 30 by the external display device 10, the request may update the code according to a predefined schedule (1002);
Creating a code for each room by the server 30 (1004);
Displaying a code for each room on the external display device 10 (1006);
Requesting an update code from the server 30 according to a predefined schedule (1008)
Scanning a QR or manually entering a code (1010);
Transmitting a unique token from mobile device 20 to server 30 (1012);
Receiving a unique token from mobile device 20 (1014);
Comparing a unique token for the room (1016);
If the code is correct, requesting ICE (Interactive Connectivity Establishment) candidates mobile and/or external (1018);
Sending ICE candidates (connection/address) to the server 30 (1020);
Receiving ICE candidates form mobile device 20 and sending to the external display device 10 (1022);
Receiving ICE candidates from the server 10 (1024);
Establishing P2P communication with mobile device 20 session WebRTC session (1026);

FIG. 3 is a flowchart diagram illustrating the processing presentation sessions of a recoding module 200 according to some embodiments of the invention.

The processing presentation sessions are as follows:
Sharing a multimedia file through the P2P connection with an ID saving at file at a local volatile memory of external display device 10 or sharing a file saved at server 30; 212
Displaying the multimedia file from the local volatile memory or from the cloud; 213
optionally translating/converting of a file to a unified/standard/vectorized file format, such as PDF, which can be activated by a graphical software; 214
User triggering recording the beginning of a session using a designated interface button; 215
Receiving captured control commands at the external display device 10 through defined presentations session over a cloud or P2P connection associated with file ID from each mobile device 20 that established P2P connection; 216
Recording captured control commands: slides presentations and hovering/pointing actions; 218
Receiving a voice stream session from each Mobile device 20 and recording audio verbal comments synchronized with a presentation display associate ID of a user device; 220
User triggering and recording the end of a session using a designated interface button; 222
Optionally enabling time out during the presentation session using designated pause button; 224

FIG. 4 is a flowchart diagram illustrating an interface device module 300 according to some embodiments of the invention.

Following the establishment of P2P connection between the mobile device 20 and the external display device 10,
Sending a multimedia file with an ID to the external display device 10; 312
Selecting and uploading a relevant UI related to the multimedia file; 314
Monitoring user interaction with UI; 316
Capturing interaction data with UI functionalities (mouse like motion on a touch screen, touch operational buttons zoom, select, typing on virtual keyboard); 318
Transmitting a captured interaction to external display device 10; 320
Streaming a voice and/or video session of each mobile device 20; 322
User mobile devices of users (secondary users), other than the first user which originated the presentation, may join the multimedia presentation by establishing communication with the external display device 10 as disclosed in FIG. 2. These secondary users may control the presentation of the external display device 10 in the same manner as the first user, as described above in steps 314-322. When connecting the external display device 10, which already loaded the presentation, the mobile device 20 receives the type of presentation for loading the relevant UI.

Figure 5:
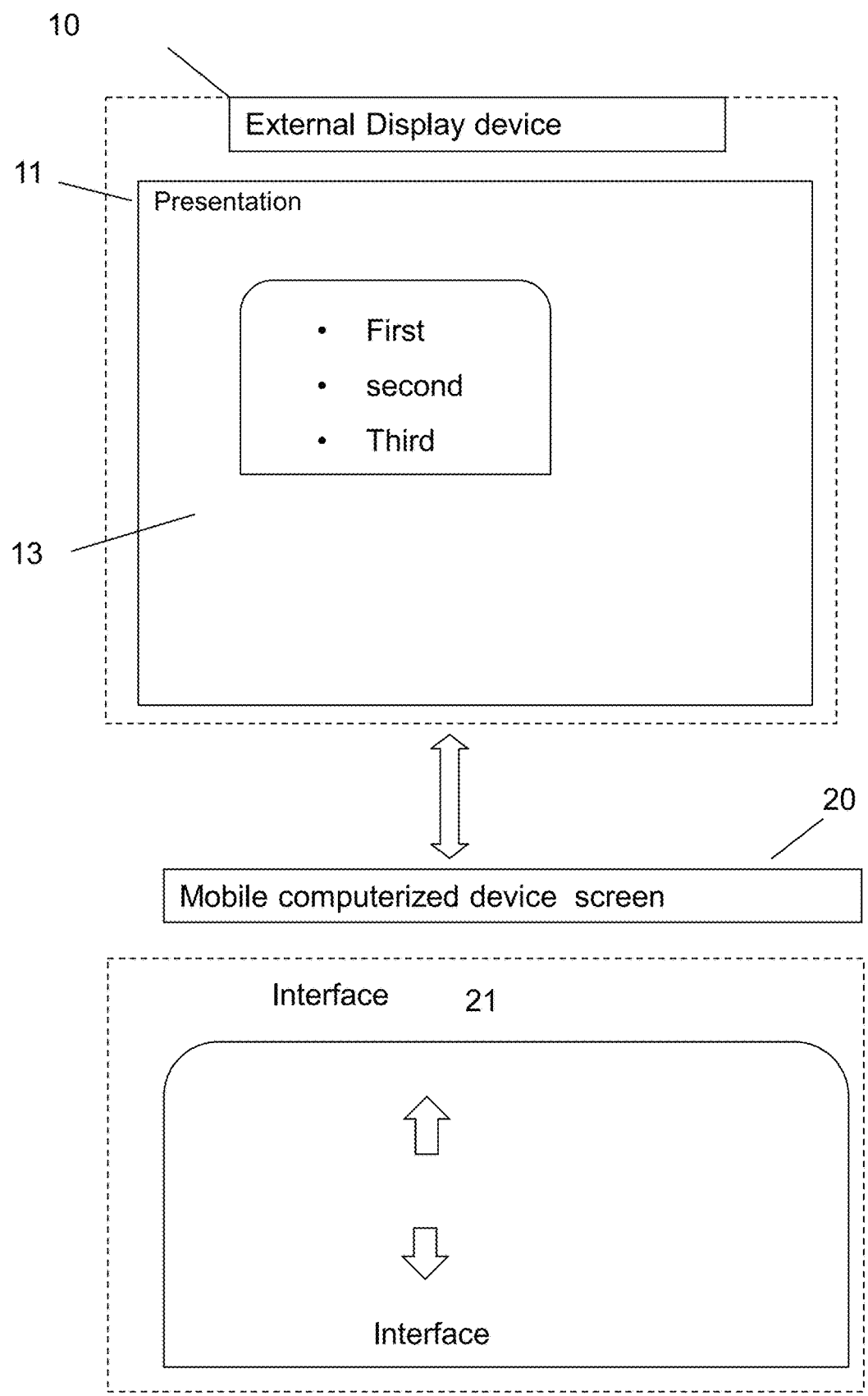
FIG. 5 is block diagram illustrating an example of the screen images appearing on the external display device and the source computer device according to some embodiments of the invention.

FIG. 5 is a block diagram illustrating an example of screen images of the multimedia file appearing on the external display device 10 and interface appearing on the source computer device according to some embodiments of the invention As seen in FIG. 5, presentation 11 with content items 13 appear on the external display device 10, and an interface GUI 21 including different operational buttons such as arrows appears on the mobile computerized device 20.

Figure 6:
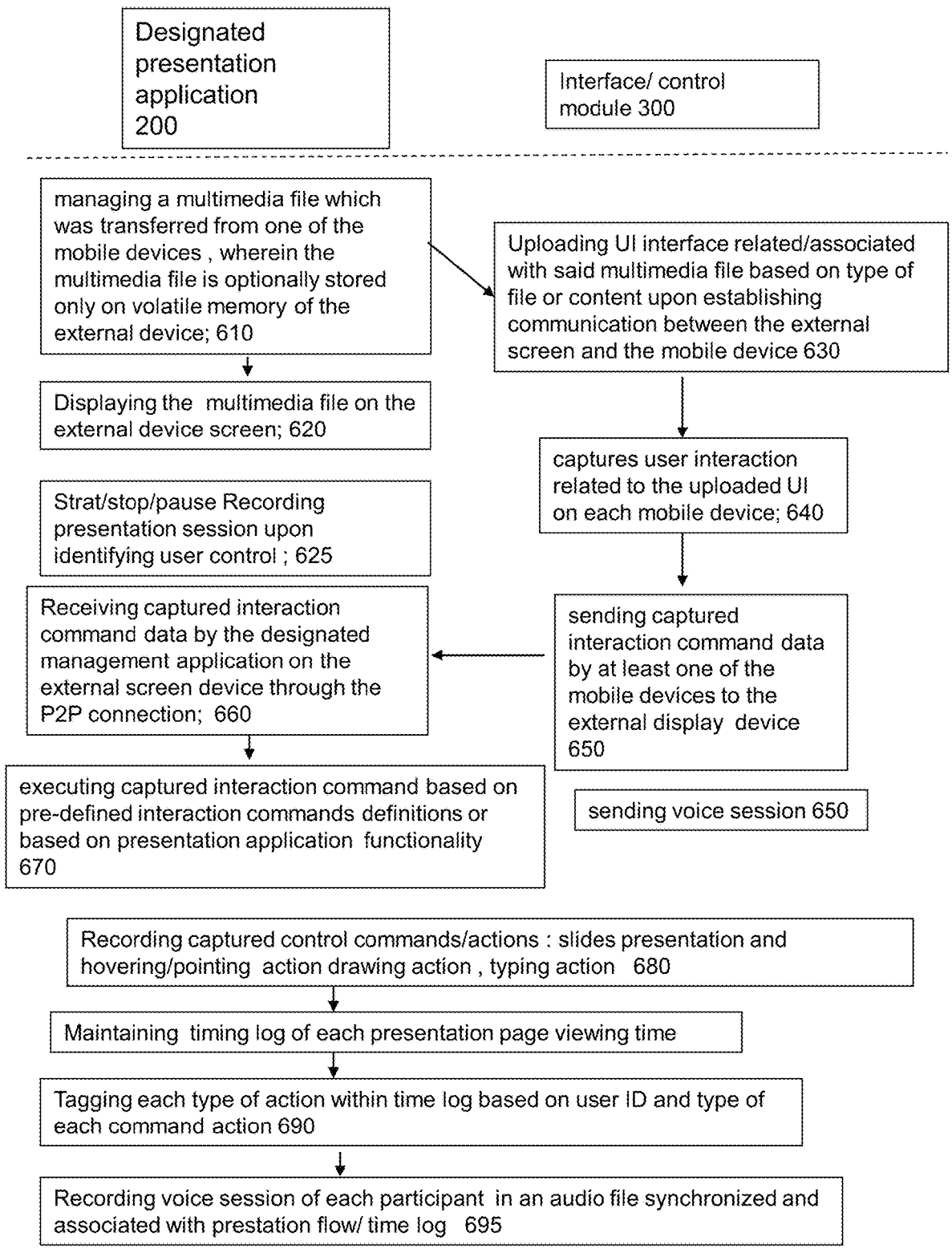
FIG. 6 is a flowchart diagram illustrating the processing of the session recording procedure according to some embodiments of the invention.

FIG. 6 is a flowchart diagram illustrating the processing steps of the session recording procedure according to some embodiments of the invention The processing steps are as follows: managing a multimedia file which was transferred from one of the mobile devices 20, wherein the multimedia file is optionally stored only on a volatile memory of the external display device 10; 610 displaying the multimedia file on the screen of the external display device 10; 620

Starting/stopping/pausing the recording of a presentation session upon identification of a user trigger; 625

Uploading a UI related/associated with said multimedia file based on the type of file or content upon establishing communication between the external display device 10 and the mobile device 20; 630 capturing user interaction related to the uploaded UI on each mobile device 20; 640 sending a captured interaction command data by at least one of the mobile devices 20 to the external display device, 650. Data may include x/y data, for pointing, or drawing commands or click strokes when typing.

sending a voice session from the mobile device to the external device; 655

Receiving a captured interaction command by the designated management application on the external display device 10 through the P2P connection; 860 executing a captured interaction command based on pre-defined interaction commands definitions 670. For example control commands enable, up down, zoom and drawing commands enable to draw according to received x/y coordinates.

Recording captured control commands/actions, slides presentation and hovering/pointing action drawing action 680;

Tagging each type of action through time log based on user ID and type of each command action 690;

Recording a voice session of each participant in an audio file synchronized and associated with presentation flow, each audio recording is synchronized with the presentation page which was displayed on the screen, at the time of the voice session 695. The recording is processed by the user mobile of the session and can be saved at the user mobile device FIG. 7 is a flowchart diagram illustrating the processing of the designated player module according to some embodiments of the invention.

According to some embodiments of the present invention the designated player generates full presentation (optionally in real time) video using the presentation recordation which includes presentation timing of each page and recorded interaction data of each user based on timing log of each presentation page viewing time and timing of each user captured interaction by applying the execution of captured interaction command based on pre-defined interaction commands definition 718A;

The processing steps of the designated player are as follows:

Receiving request for customized recordation of presentation session with customization parameters (type of action, user ID, slides ID/content 712

Search session recordation of activity log for requested customization parameters identifying time log for each required recordation/presentation time period and or identified action identifying presented page 714;

Generating customized presentation (optionally in real time) video based on timing log of each requested presentation page viewing time and timing of each user identified captured interaction by applying the execution of captured interaction command based on pre-defined interaction commands definition 718B integrating generated presentation into a single video and synchronizing with respective audio parts of the same identified time log 720;

Optionally Streaming generated presentation synchronized with respective audio parts of the same identified time log 722;

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment. For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

What is claimed is:

1. A method comprising:
   verifying a plurality of participant communication devices;
   establishing peer to peer communication between a first computing device and the plurality of participant communication devices, responsive to the verifying;
   beginning displaying a presentation of a multimedia file on a screen of the first computing device;
   beginning a recording while displaying the presentation at the first computing device, responsive to a start trigger from a first participant of the plurality of participants;
   receiving, at the first computing device while displaying the presentation of the multimedia file, a first control command from the first participant communication device and a second control command from a second participant communication device;
   executing, while displaying the presentation of the multimedia file, the first control command on the screen of the first computing device, responsive to receiving the first control command, and the second control command on the screen of the first computing device, responsive to receiving the second control command;
   maintaining a timing log at the first computing device while displaying the presentation of the multimedia file, the timing log comprising a first participant identification, a first time during the displaying of the presentation of the multimedia file at which the first control command occurred, a second participant identification, and a second time during the displaying of the presentation of the multimedia file at which the second control command occurred;
   ending the recording and ending the displaying of the presentation of the multimedia file responsive to an end trigger from the first participant of the plurality of participants; and
   generating, at the first computing device, a video comprising the presentation of the multimedia file including the recording, the first control command, and the second control command, responsive to ending the displaying of the presentation.

2. The method of claim 1, wherein the first control command and the second control command are further based on a pre-defined interaction command definition that includes mouse motion, touch screen operations, drawing input, and keyboard input.

3. The method of claim 1, further comprising receiving, at the first computing device before ending the recording, a voice stream session from the first participant communication device or the second participant communication device, the voice stream session comprising a verbal comment made by a user of the first participant communication device or the second communication device.

4. The method of claim 3, further comprising adding into the timing log, at the first computing device, a respective time during the displaying of the presentation at which the verbal comment occurred; and wherein generating the video further comprises including the verbal comment in the video, at the respective time during the displaying of the presentation at which the verbal comment occurred.

5. The method of claim 1, further comprising:
   receiving, at the first computing device, a request to generate the video with user interactions including control commands and verbal sessions associated with a requested user identification (ID); and
   generating the video comprising including the user interaction in the video.

6. The method of claim 1, the presentation comprising a plurality of slides, individual of the slides associated with a slide identifier (slide ID), the method further comprising receiving a request to generate the video, the request comprising information indicating a slide associated with a requested slide ID is to be included in the video, the requested slide ID matching the slide ID, the generating the video comprising including the slide in the video.

7. The method of claim 1, further comprising:
   adding into the timing log, at the first computing device, an action type associated with the first control command; and
   receiving, at the first computing device, a request to generate the video, the request comprising information indicating user interactions of the action type are to be included in the video, the generating the video including occurrences of the action type in the video.

8. One or more computer-readable media storing instructions that, when executed, cause one or more processors to:
   verify a plurality of participant communication devices;
   establish peer to peer communication between a first computing device and the plurality of participant communication devices, responsive to the verifying;
   begin displaying a presentation of a multimedia file on a screen of the first computing device;
   begin a recording of the displaying of the presentation at the first computing device, responsive to a start trigger from a first participant of the plurality of participants;
   while displaying the presentation:
      receive, at the first computing device, a first control command from a first participant communication device;
      execute the first control command on the screen of the first computing device, responsive to receiving the first control command;
      receive, at the first computing device, a second control command from a second control command from a second participant communication device; and
      maintain a timing log at the first computing device, the timing log comprising a first participant identification and a first time during the displaying of the presentation of the multimedia file at which the first control command occurred and a second participant identification and a second time during the displaying of the presentation of the multimedia file at which the second control command occurred;
   end the recording and the displaying of the presentation of the multimedia file responsive to an end trigger from the first participant of the plurality of participants; and
   generate, at the first computing device, a video comprising the presentation of the multimedia file including the recording, the first control command, and the second control command, responsive to ending the displaying of the presentation.

9. The one or more computer-readable media of claim 8, wherein the first control command and the second control command are further based on a pre-defined interaction command definition.

10. The one or more computer-readable media of claim 8, the instructions to further cause the one or more processors to receive, at the first computing device before ending the recording, a voice stream session from the first participant communication device, the voice stream session comprising a verbal comment made by a user of the first participant communication device during the display of the presentation of the multimedia file.

11. The one or more computer-readable media of claim 10, the instructions to further cause the one or more processors to add into the timing log, at the first computing device, a respective time during the display of the presentation at which the verbal comment occurred, and wherein, to generate the video further comprises to including the verbal comment in the video at the respective time during the display of the presentation at which the verbal comment occurred.

12. The one or more computer-readable media of claim 8, the instructions to further cause the one or more processors to:
receive, at the first computing device, a request to generate the video with control commands and verbal sessions associated with a requested user identifier (requested user ID); and
generate the video comprising the control commands and verbal sessions in the video.

13. The one or more computer-readable media of claim 8, the presentation comprising a plurality of slides, individual of the slides associated with a slide identifier (slide ID), the instructions to further cause the one or more processors to receive a request to generate the video, the request comprising information indicating a slide associated with a requested slide ID is to be included in the video, the requested slide ID matching the slide ID, to generate the video comprising to include the slide in the video.

14. The one or more computer-readable media of claim 8, the instructions to further cause the one or more processors to:
add into the timing log, at the first computing device, an action type associated with the first control command;
receive, at the first computing device, a request to generate the video with user interactions of the action type; and
generate the video comprising occurrences of the user interaction of the action type.

15. A computing system comprising:
one or more processors; and
one or more computer-readable media storing instructions that, when executed, cause the one or more processors to:
verify a plurality of participant communication devices;
establish peer to peer communication between a first computing device and the plurality of participant communication devices, responsive to the verifying;
display a presentation of a multimedia file on a screen of the first computing device;
start a recording of the display of the presentation;
receive, at the first computing device, a first control command from a first participant communication device, and a second control command from a second participant communication device;
execute, at the first computing device, while displaying the presentation of the multimedia file, the first control command and the second control command;
maintain a timing log, at the first computing device, the timing log comprising a first participant identification and a first time during the displaying of the presentation of the multimedia file at which the first control command occurred, and a second participant identification and a second time during the displaying of the presentation of the multimedia file at which the second control command occurred;
end the recording and the displaying of the presentation of the multimedia file responsive to an end trigger from the first participant of the plurality of participants; and
generate, at the first computing device, a video comprising the presentation of the multimedia file including the recording, the timing log, the first control command and the second control command, upon ending the display of the presentation.

16. The computing system of claim 15, wherein the first control command and the second control command are further based on a pre-defined interaction command definition.

17. The computing system of claim 15, the instructions to further cause the one or more processors to:
add into the timing log, at the first computing device, a user identifier (user ID) associated with the first participant communication device; and
receive, at the first computing device, a request to generate the video with user interactions including control commands and verbal sessions associated with a requested user identifier (requested user ID); and
generate the video comprising the user interactions in the video.

* * * * *